No. 625,256. Patented May 16, 1899.
S. GRAHAM.
SELF SETTING ANIMAL TRAP.
(Application filed Feb. 27, 1899.)

(No Model.)

UNITED STATES PATENT OFFICE.

SAMUEL GRAHAM, OF BROOKLYN, IOWA.

SELF-SETTING ANIMAL-TRAP.

SPECIFICATION forming part of Letters Patent No. 625,256, dated May 16, 1899.

Application filed February 27, 1899. Serial No. 707,128. (No model.)

*To all whom it may concern:*

Be it known that I, SAMUEL GRAHAM, a citizen of the United States of America, residing at Brooklyn, in the county of Poweshiek and State of Iowa, have invented a new and useful Self-Setting Animal-Trap, of which the following is a specification.

My object is to combine simple and effective trap mechanism with a box or cage that has a vertical partition to produce two distinct compartments in such a manner that when a rat or other animal enters the one compartment through an open doorway an elevated door will drop and close by force of gravity and confine the animal in the first compartment, and when the animal passes through an opening in the partition to the second compartment the weight of the animal will elevate the door in the first compartment, and the passage-way leading from the first compartment to the second will be automatically closed, as required to confine the animal in the second compartment, while the doorway in the first compartment is open to admit and trap another animal.

My invention consists in the arrangement and combination of two tilting platforms with the vertical partition in a cage or trap mechanism, a vertically-sliding door at one end of the trap, trip mechanism for supporting the door when elevated over the doorway, and means for baiting the trap, as hereinafter set forth, pointed out in my claims, and illustrated in the accompanying drawings, in which—

Figure 1:
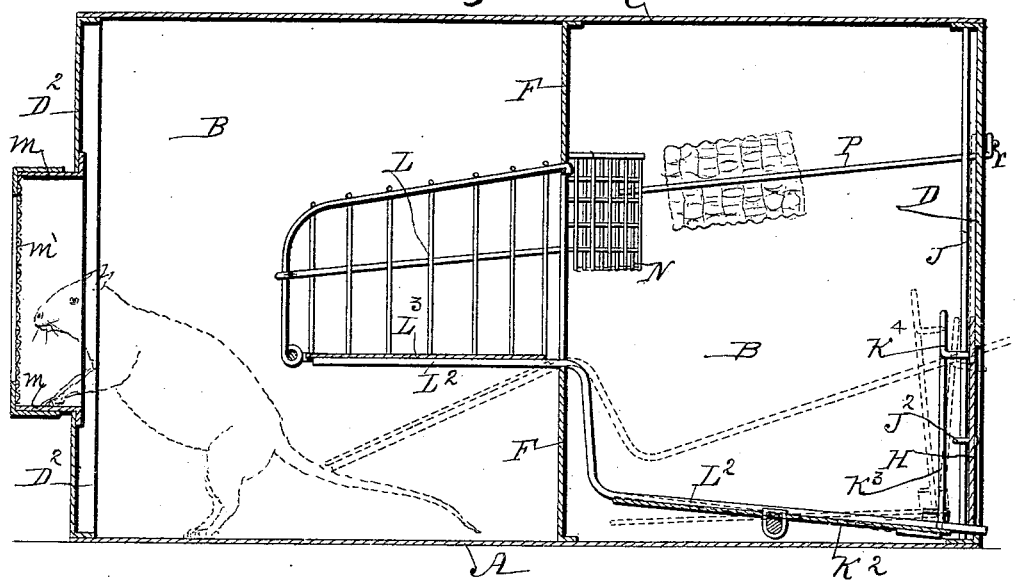
Figure 2:
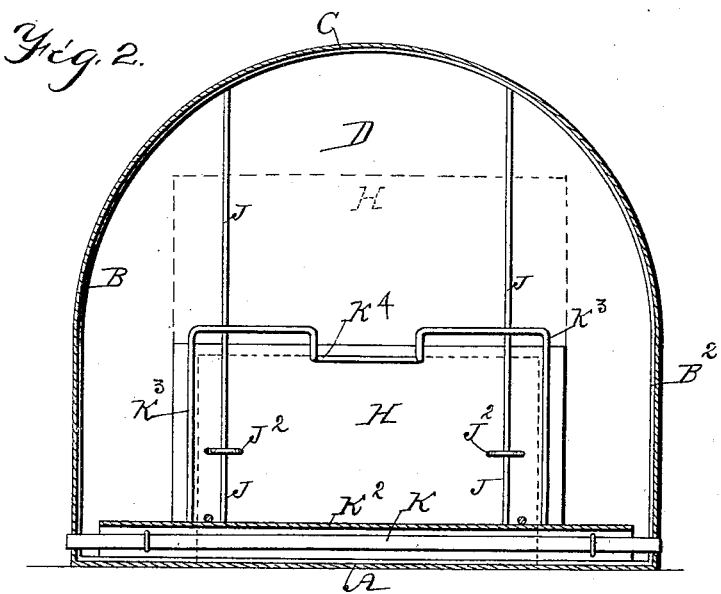

Figure 1 is a longitudinal section of the trap, showing both of the tilting platforms and the trip mechanisms in their normal positions and the sliding door closed and resting upon the ends of rods or a lever extending from the inner and elevated platform. Dotted lines indicate the positions assumed by the platforms, the sliding door, and the trip device when operated as required to open and close the passage-way in the end wall and also the passage leading from the first compartment to the second. Fig. 2 is a transverse sectional view looking toward the end wall and the inner face of the vertically-sliding door and the trip device connected with the tilting platform for supporting the door in an elevated position, as required to have the doorway in the wall open.

The letter A designates the bottom; B and B², the side walls; C, the top, (preferably arched and integral with the side walls,) and D and D² the ends of the box or cage. It may vary in dimensions, as required to suit large and small animals, and may be made of sheet metal, wood, or woven wire.

F is a fixed partition that divides the cage into two distinct compartments.

H is a door fitted to close an opening in the front end wall D. It is slidingly connected with fixed rods J, that extend vertically in parallel position, by means of staples J², fixed to the door.

K is a rock-shaft in bearings formed in or fixed to the parallel side walls B and B².

K² is a platform fixed to the rock-shaft and extends across the bottom portion of the first compartment of the cage in such a manner that when an animal enters the weight of the animal will actuate the trip mechanism, as required to let the door drop by force of gravity to close the doorway.

K³ is a trip device in the form of a three-sided frame made of wire, and the lower ends of the parallel upright portions are fixed to the front portion of the platform K² to rise and descend therewith. The horizontal and central portion of the frame is bent downward and then forward to produce a support K⁴, adapted to slip under the bottom of the door H when the door is elevated, as required to retain the door open.

L is a chamber adapted for the passage of an animal from the first compartment of the cage to the second. For rats and small animals it is preferably made of wire and its open end fixed in an opening in the partition F to allow an animal to enter the chamber and pass down through when the bottom of the chamber is open.

L² is a lever in the form of a frame made of wire (for small animals) and fulcrumed to the partition F at the bottom of the opening in the partition to extend parallel with the open bottom of the chamber L, as required to close its open bottom by means of a platform L³, fixed to the frame or inner end of the lever. The parallel portions of the lever in front of the partition F are bent downward and then forward over the platform K² and terminate under the bottom edge of the door H in such a manner that when the platform L³ is depressed by the weight of an animal the front ends of the lever will lift the sliding door to allow the support K⁴ to slip under the bottom of the door to retain the door elevated.

$m$ is an extension at the rear end of the wall over a corresponding opening in the end wall D², and $m'$ is a cover, preferably made of wire, to allow light to enter, that will be advantageous when the cage is made of opaque sheet metal or wood.

N represents a receptacle for cheese or other suitable bait, connected with the partition F.

Wires P, having hooks on one end, are adapted for holding a piece of corn or other bait, as shown in Fig. 1. The hooks are adapted to enter eyes or staples $r$, fixed to the front end of the cage, to detachably fasten the wire bait-holders.

In the practical use of my invention when the operative parts are in position, as shown in Fig. 1, I lift the door H and allow that part of the trip device K⁴ adapted to slip under the door to assume such a position as will retain the door elevated and the trap set in position to allow an animal to enter under the door, and when it gets upon the inclined platform the weight of the animal will cause the platform to assume a level position, and as its front portion rises the trip device and door-support will move inward from under the door, as indicated by dotted lines in Fig. 1, and allow the door to drop and close the doorway. The animal thus caught in the first compartment will then naturally try to escape through the opening in the partition F and get upon the platform L³, which will be depressed by the weight of the animal, and the animal will slip off into the second compartment, and such depression of the platform on the rear end of the frame or lever L² will cause the front end of the frame to lift the door H as required to let the trip device K⁴ engage the bottom of the door to retain it elevated and the trap thus automatically set to admit another animal. It is therefore obvious that numbers of rats may be thus caught in succession and the trap set every time one rat passes from the first compartment to the other.

Having thus described my invention and its operation, its simplicity and utility will be apparent to persons familiar with the art to which it pertains, and what I therefore claim, and desire to secure by Letters Patent therefor, is—

1. In an animal-trap, a box or cage having a central vertical partition to produce two compartments, a doorway in one of the ends of the cage, a vertically-sliding door fitted over the doorway, a tilting platform at the bottom inside of the door, an opening in the partition and a bottomless chamber having an open end fixed to said partition to extend horizontally into one compartment and communicate with the other compartment, a frame or lever fulcrumed to the partition to extend under the open-bottomed chamber, a platform fixed to the end of said lever to close the open-bottomed chamber and the lever extended toward and under the vertically-sliding door, and a trip device for supporting the door when elevated, all arranged and combined to operate in the manner set forth for the purposes stated.

2. The partition F having an opening, a chamber L fixed to the partition to extend horizontally, a frame or lever L² fulcrumed in the partition, a platform L³ fixed to the lever to close the bottom of said chamber and the parallel parts of the lever extended under a vertically-sliding door fitted over a doorway in the wall of the trap, and a trip device for engaging and supporting the door when elevated, arranged and combined as shown and described.

3. A self-setting animal-trap comprising a box or cage having a doorway at one end, a vertically-sliding door fitted to the wall to open and close the doorway, a tilting platform in the bottom of the cage inside of the doorway, a trip device carried by said platform to engage and support the door when elevated, a fixed partition to divide the cage into two compartments, an opening in the partition and an open-bottomed chamber fixed to the partition and communicating with the two compartments, a frame or lever fulcrumed to the partition, a platform fixed to one end of the lever to close the open-bottomed chamber and the other end of the lever extended to engage and lift the sliding door, all arranged and combined to operate in the manner set forth for the purposes stated.

SAMUEL GRAHAM.

Witnesses:
C. C. HEATH,
L. M. BENNETT.